May 21, 1963
A. N. MOORE
3,090,485
CURRENCY DETECTOR
Filed July 7, 1961
4 Sheets-Sheet 2
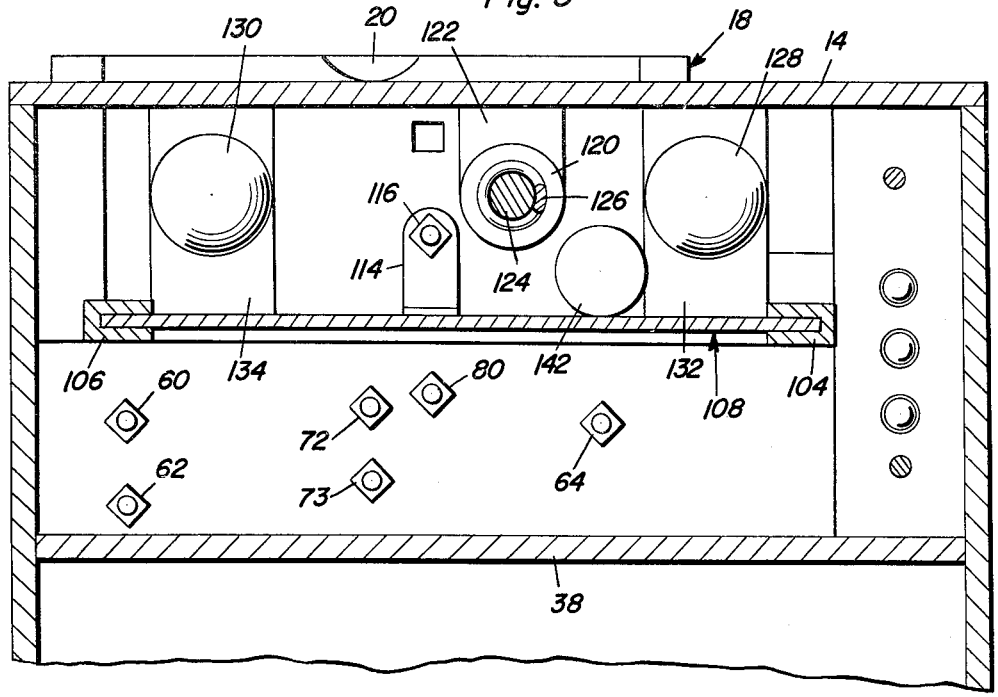
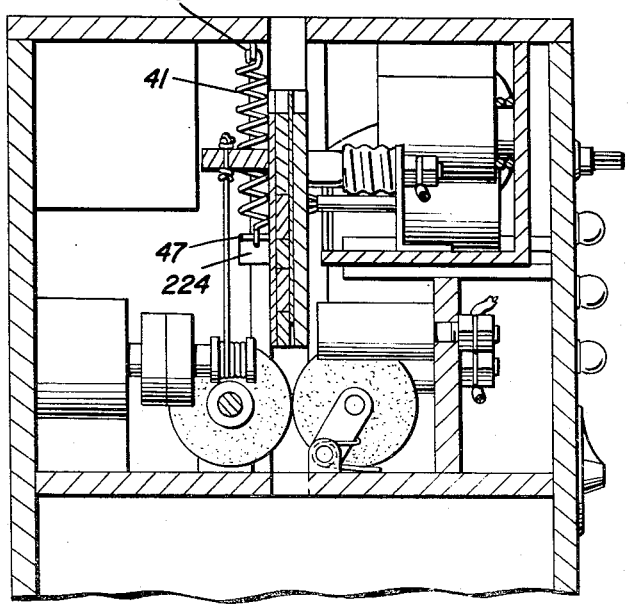
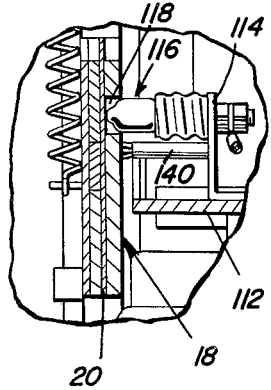
Albert N. Moore
INVENTOR.

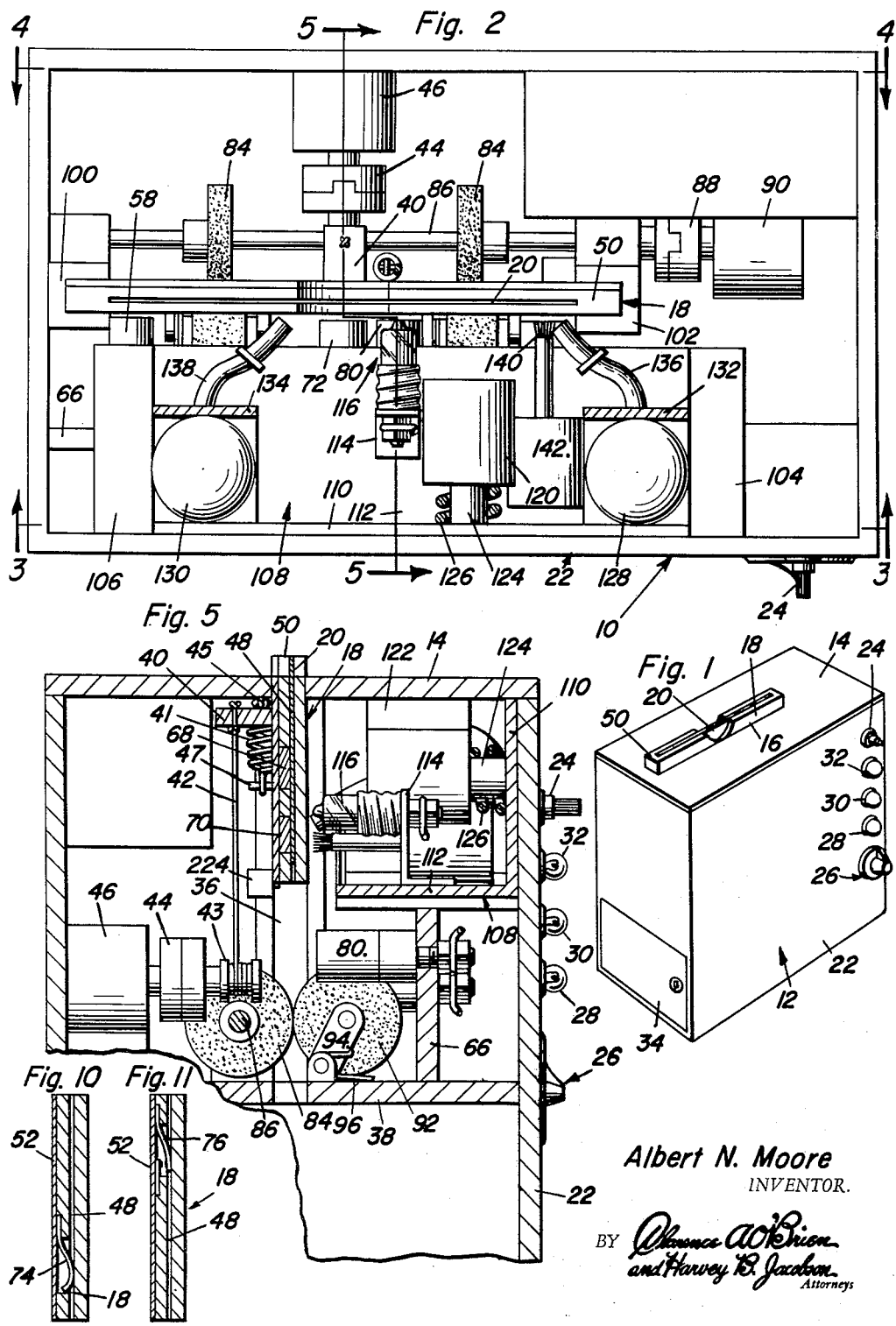

May 21, 1963     A. N. MOORE     3,090,485
CURRENCY DETECTOR
Filed July 7, 1961     4 Sheets-Sheet 3
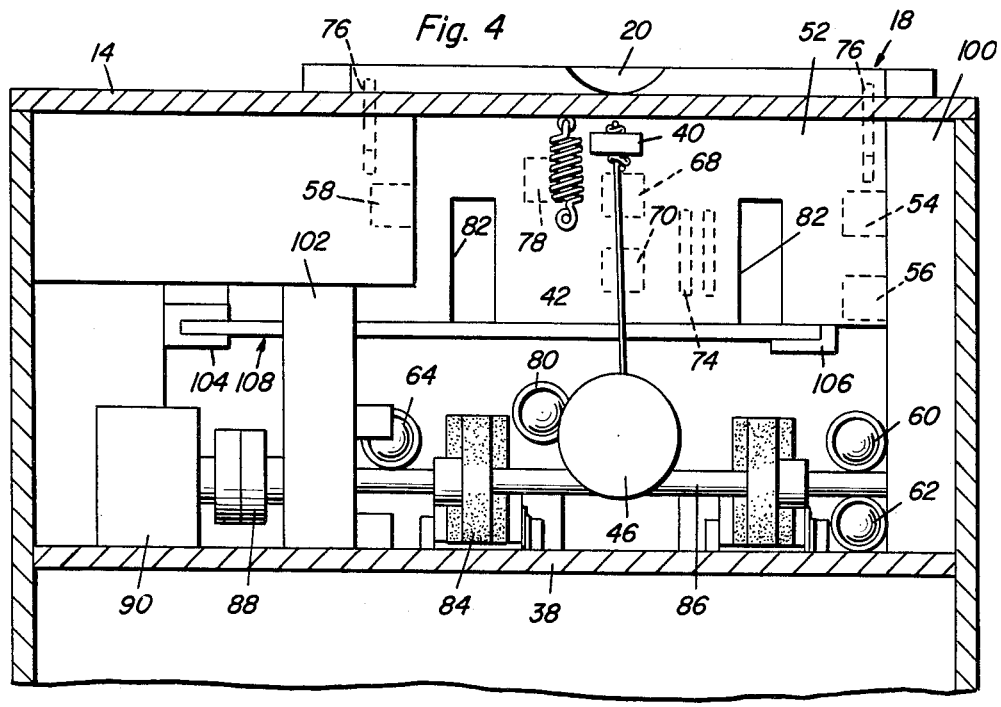
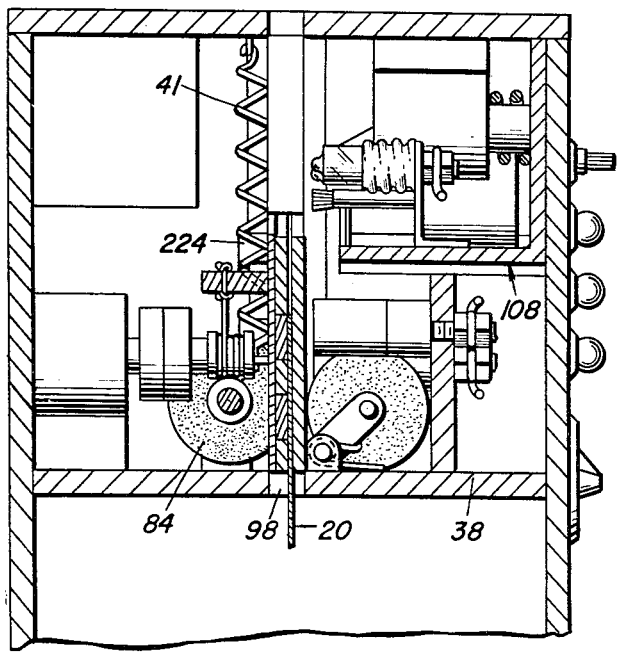
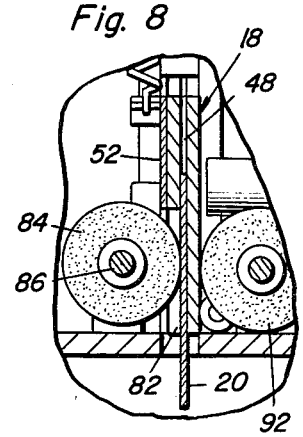
Albert N. Moore
INVENTOR.
BY Clarence A. O'Brien
and Harvey B. Jackson
Attorneys May 21, 1963

A. N. MOORE 3,090,485

CURRENCY DETECTOR

Filed July 7, 1961

Albert N. Moore
INVENTOR.

United States Patent Office 3,090,485
Patented May 21, 1963

3,090,485
CURRENCY DETECTOR
Albert N. Moore, Richmond, Va., assignor of ten percent to Wilbur Bernstein, Richmond, Va., and ten percent to Bernard H. Goldstein
Filed July 7, 1961, Ser. No. 122,442
8 Claims. (Cl. 209—75)

This invention relates to a new and useful device that will automatically, rapidly and more reliably determine whether paper currency is genuine, counterfeit and/or otherwise unfit.

It is therefore a primary object of the present invention to provide an automatically operative machine into which paper currency is inserted for the purpose of establishing whether or not it is counterfeit in accordance with several criteria.

Another object of this invention is to provide an automatically operative counterfeit detecting machine capable of making a determination on the basis of physical, chemical and electrical properties of the paper and ink with which the currency is made and printed as well as the relative locations of the inked portions on the paper.

A further object of this invention is to provide an automatic detecting machine which may be selectively conditioned to detect counterfeit currency of different denominations.

In accordance with the foregoing objects, the detecting machine of the present invention is provided with light detectors by means of which the printed pattern or the relative location of light and inked areas on the paper on which the currency is printed, may provide one basis upon which counterfeit currency is detected and in addition thereto, the quality of the currency material is tested for both counterfeit and unfit currency by treating with chemical liquids in order to measure the conductivity of the currency paper so impregnated and also its ability to hold the ink when an eraser is applied thereto. Also, the ability of the paper to withstand heat constitutes a further measure of the genuineness of the currency paper. All of the foregoing currency material and pattern tests are applied to the paper currency by the present invention in a sequential and automatic fashion. Should the paper currency pass all of the tests, it is passed through the machine. If on the other hand, the paper currency cannot pass any one of the aforementioned tests, it is rejected by return with the inserting mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the detecting device of the present invention.

FIGURE 2 is a top plan view of the detecting device with the top cover thereof removed.

FIGURE 3 is a partial sectional view taken substantially through a plane indicated by section line 3—3 of FIGURE 2.

FIGURE 4 is a partial sectional view taken substantially through a plane indicated by section line 4—4 in FIGURE 3.

FIGURE 5 is a partial sectional view taken substantially through a plane indicated by section line 5—5 in FIGURE 2.

FIGURE 6 is a partial sectional view similar to that of FIGURE 5 showing the detecting device in another operative condition.

FIGURE 7 is a partial sectional view similar to that of FIGURE 5 illustrating the device in a third operative condition.

FIGURE 8 is a partial sectional view in a plane parallel to that of FIGURE 7 illustrating a detail of the rejecting mechanism.

FIGURE 9 is a partial sectional view taken through a plane parallel to that of FIGURE 6.

FIGURE 10 is a sectional view through the cradle showing the installation of contact elements therein.

FIGURE 11 is a sectional view through the cradle showing the installation of an insert switch therein.

Figure 12:
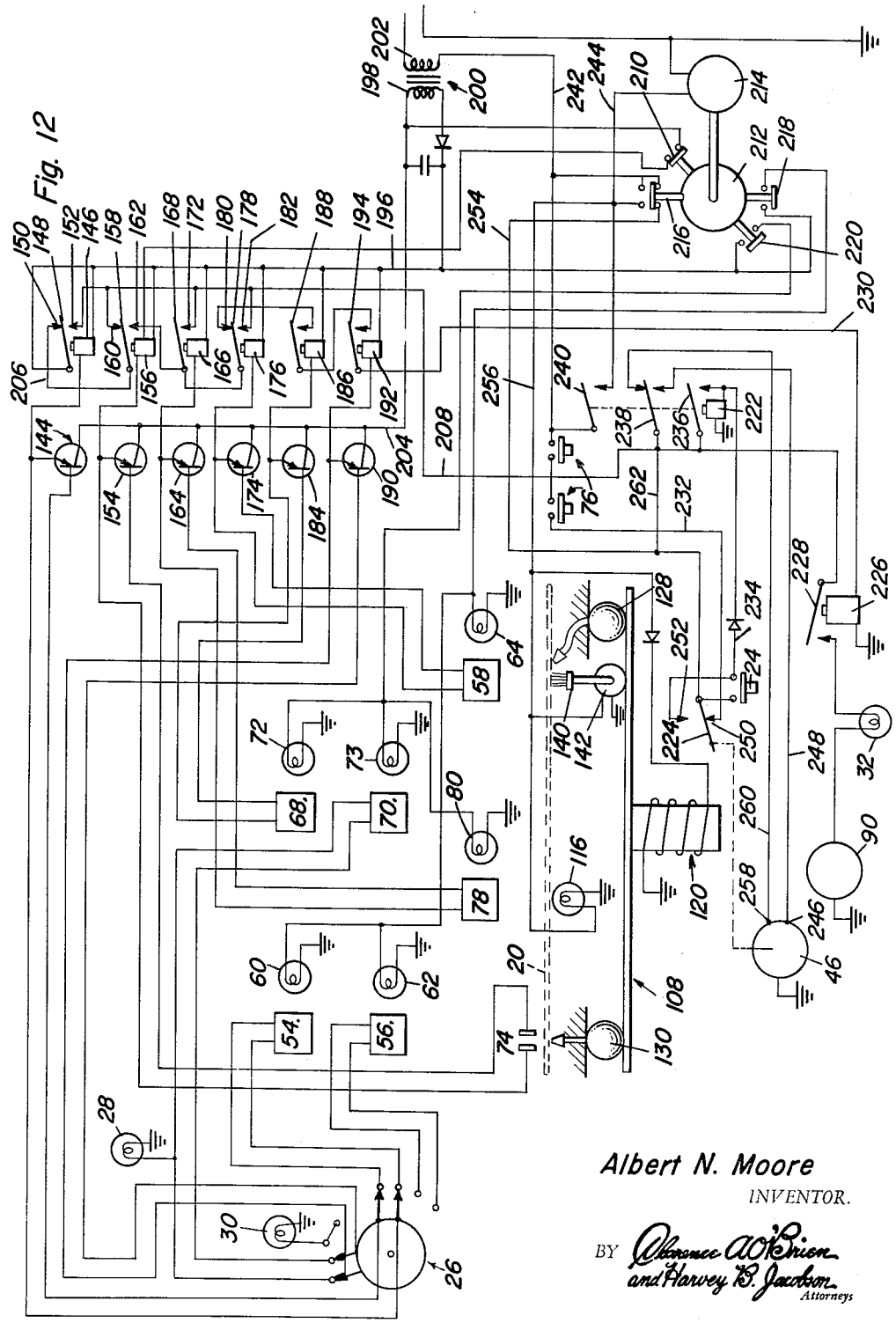
FIGURE 12 is a circuit diagram illustrating the electric control system for the detecting device.

Referring now to the drawings in detail, it will be observed from FIGURE 1 that the detecting device generally referred to by reference numeral 10 is housed within a casing generally referred to by reference numeral 12 having a top lid portion 14 within which there is formed a slot 16 for slidably receiving the upper end portion of an insert cradle transport slide device 18 operationally conditioning the machine 10 by insertion of paper currency 20 thereinto. The casing has mounted on one face 22 thereof a start switch 24 and a selector switch 26 by means of which the device 10 may be conditioned for detecting paper currency of different denominations. For example, the device herein described as one exemplary embodiment of the invention, is capable of detecting either one dollar bills or five dollar bills in United States currency. It should however be understood, that the number of different denominations and the type of currency capable of being detected may be varied without departing from the spirit of the present invention. Also mounted between the start switch 24 and the selector switch 26, are indicating lights 28 and 30 by means of which a visual indication is provided of the denomination of the currency being detected. The light indicator 32 on the other hand indicates whether the paper currency being detected is genuine and that the machine is operating properly. After the bill 20 is inserted within the cradle device 18, the starter switch 24 is actuated after the selector 26 has been set to the proper denomination, whereupon the cradle device 18 is withdrawn within the casing 12. Either the light indicator 28 or 30 will then be lit. Should the bill 20 be counterfeit or unfit for use, the cradle will finally be restored to its original position with 20 remaining therewithin. If on the other hand, the bill 20 is genuine and is in usable condition the indicator light 32 illuminates and the cradle device 18 is finally returned to its initial position without the bill therein. The genuine bill will have therefore been accepted and retained within a container either associated with the machine 10 for such purpose or within a chamber formed within the machine 10 itself. A door 34 may therefore be provided on one side of the casing 12 in order to remove the genuine bills from the device 10.

Referring now to FIGURES 2, 3, 4 and 5, it will be observed that the cradle device 18 is slidably mounted within a track 36 that is mounted between the top lid member 14 and a partition supporting member 38. On one side of the cradle device 18, there is fastened an actuating arm 40 to which a cable 42 is connected for the purpose of slidably moving the cradle 18 downwardly against the bias of a spring 41 anchored to the housing lid and cradle respectively by hooks 45 and 47. The cable 42 is therefore wound about a spool 43 that is drivingly connected through a clutch device 44 to a cradle driving motor 46 fixedly mounted in the casing 12. The cradle driving motor 46 is therefore of the reversible type so that the cable 42 may be wound up upon the spool 43 or unwound therefrom in order to slidably move the cradle 18 between an upper position as illustrated in FIGURE 5 to a lower position as illustrated in FIGURE 7, said cradle 18 also stopping at an intermediate position as illustrated in FIGURE 6 after having actuated limit switch 224. The cradle is also formed with a slot 48 within which the paper currency is received. The bill 20 is placed within the slot with the upper edge thereof flush with the upper surface 50 of the cradle in order to properly position the bills for detection purposes by the device. The cradle therefore has mounted therewithin on one side of the slot 48, a plurality of pattern detecting photocells for the purpose of determining whether or not the bill is opaque or light transmissive at designated areas which are indicative of a genuine bill. Referring therefor to FIGURE 4 in particular, it will be observed that the rear side 52 of the cradle 18 has mounted therewithin photocell detectors 54, 56 and 58 which are provided for the purpose of determining whether or not the bill within the cradle 18 is opaque at those areas which are aligned with the detectors 54, 56 and 58 respectively. Accordingly, when the cradle 18 is in its down position, the detectors 54, 56 and 58 will be aligned with light bulbs 60, 62 and 64 respectively. The bulbs constitute therefor light sources fixedly mounted within the casing 12 by the support member 66 as more clearly seen in FIGURE 5 and disposed on the other side of the cradle 18 from side 52 within which the detectors are mounted. It will therefore be apparent that when the bulbs are energized and the bill is aligned with the light bulbs in the down position, the opaque detectors 54, 56, and 58 if conductive will signal that the bill is counterfeit. Also mounted within the side 52 of the cradle are a pair of light area detectors 68 and 70 which similarly cooperate with light bulbs 72 and 73 in order to detect the presence of light transmissive areas on the bill. Should the bill be counterfeit, in this latter respect, the detectors 68 and 70 when aligned with the light bulbs 72 and 73 in the down position of the cradle, will not be conductive and thereby signal that the bill is opaque where it should be light transmissive and thereby reject the bill as counterfeit.

The cradle 18 also mounts therewithin on the side 52, a pair of material conductivity testing contact elements 74 as more clearly seen in FIGURES 4 and 10. The contact elements 74 when bridged by a conductive portion of the bill 20 will close a circuit in order to indicate the presence of a counterfeit or unduly worn bill. The side 52 of the cradle is further provided with a pair of insert switch devices 76 disposed adjacent the lateral sides of the cradle 18 as more clearly seen in FIGURES 4 and 11. The contacts of the insert switches 76 close in response to reception of a bill within the cradle slot 48. The device 10 is thereby operatively conditioned for its automatic operation. The cradle slide device 18 is further provided with a detector 78 which is aligned with the light bulb 80 when the cradle slide is in its down position. Should the bill be genuine, detector 78 is rendered conductive in response to energization of the bulb 80 after the detected area has been subjected to heat. It will therefore be apparent from the foregoing, that the detectors 54, 56, 58, 68, 70, 78 and the contact 74 will be operative to indicate whether or not the bill is counterfeit by several standards and/or unduly worn. The pattern detectors 54 and 56 are therefore operative to determine the presence of opaque areas of the bill adjacent one edge thereof. The centrally disposed pattern detectors 68 and 70 are operative to determine the presence of light transmissive areas within the portrait portions of the bill. Depending upon the denomination of the bill being detected, one or the other of the opaque detectors 54 and 56 may be selectively rendered operative and one of the light area detectors 68 and 70 rendered inoperative. The ink retentivity detector 58 on the other hand is so located as to be aligned with inked or opaque portions of all bills for which the device 10 is designed but is arranged to signal any light transmissive property of the bill after the opaque or inked area has been treated with a chemical liquid and physically erased, as will be hereafter further explained. The heat resistivity detector 78 although aligned with a light transmissive area of all bills is operative to reject a bill after the area with which the detector 78 is aligned has been subjected to heat which would cause the paper of a counterfeit bill to be blackened. The electrical conductivity contacts 74 on the other hand bridge a portion of the bill to which liquid chemical is applied. Should the paper of the currency be rendered electrically conductive as a result of the liquid chemical, a circuit will be closed in order to signal that the paper of the currency does not have the proper electrical conductivity properties either because it is counterfeit or unfit for use. If for any of the above indicated reasons, the bill is rejected as counterfeit, the cradle slide device 18 after being withdrawn to its down position, is returned to its upper position with the bill remaining therewith. If on the other hand, the bill passes all of the tests applied thereto, it is ejected from the cradle slide device 18 prior to the return thereof to the upper position.

It will therefore be observed from FIGURES 4 and 8, that a pair of slots 82 are formed in the rear side 52 of the cradle slide device 18 exposing the bill 20. Aligned with the slots 82, are a pair of friction wheels 84 disposed adjacent the bottom of the track 36 for the cradle slide 18. Accordingly, when the cradle slide 18 is moved to its down position, the friction wheels 84 engage the bills 20 through the slot 82 in the slide 18. The friction wheels are therefore fixedly mounted on a shaft 86 which is coupled by a clutch device 88 to an ejecting motor 90. The other side of the cradle slide 18 is engaged by a pair of friction wheels 92 pivotally mounted by arms 94 and spring biased by spring element 96 for applying to the cradle slide, pressure sufficient to cause ejection of the bills 20 therefrom in response to powered rotation of the ejection friction rollers 84. It will therefore be apparent, that when the cradle slide 18 is moved to the down position and no counterfeit signal is received by the control system, the ejecting motor 90 will be energized in order to eject the bills 20 through the slot 98 of the partition support member 38 as more clearly seen in FIGURE 7. The bills 20 will therefore be received within the chamber formed below the partition support member 38. It will however become apparent that before the cradle slide 18 is moved to its down position as shown in FIGURE 7, it stops at an intermediate position as illustrated in FIGURES 6 and 9 for the purpose of applying various tests to the bill in connection with the counterfeit detection provided by the photocell detectors 58 and 78 and the contact elements 74.

The casing 12 is therefore provided with a pair of vertical track devices 100 and 102 forming the track 36 for guiding vertical movement of the cradle slide 18 and also a pair of horizontal track devices 104 and 106 for guiding horizontal sliding movement for a material testing slide carriage assembly 108. The carriage assembly 108 is provided with a vertical wall 110 and a horizontal supporting bottom portion 112 that is slidably received with the slide devices 104 and 106. Mounted on the bottom portion 112 by means of a bracket member 114 is a heat resistivity testing device 116 which is aligned with an aperture 118 in the cradle slide 18 as more clearly seen in FIGURE 9 so that when the carriage assembly 108 is moved toward the cradle slide 18, the heater bulb 116 will contact the bill 20. Should the paper of the bill fail to have the heat resistant qualities of a genuine bill, it will be blackened by contact with the heater device 116, when energized.

In order to move the carriage assembly 108 toward the cradle slide 18, a carriage actuating solenoid 120 is fixedly mounted within the casing 12 and suspended from the lid 14 by any suitable brackets 122 as more clearly seen in FIGURES 3 and 5. The solenoid armature 124 is therefore connected to the wall 110 of the carriage assembly so that when the solenoid 120 is energized it will draw the carriage assembly 108 toward the cradle slide 18. When the solenoid 120 is denergized, the spring 126 will be operative to retract the carriage assembly 108 up against the front wall 22 of the casing. When the carriage assembly 108 is moved toward the cradle 18, a pair of liquid chemical plastic containers 128 and 130 that are mounted on the carriage assembly are respectively compressed against fixed panels 132 and 134 in order to squirt the liquid chemicals onto the bill through aligned apertures in the cradle slide by means of the squirting hose elements 136 and 138 as more clearly seen in FIGURE 2. The liquid chemical within the container 130 is therefore operative to test the paper of the currency for its electrical conductivity properties. Should the bill be genuine, the chemical will not be able to render the treated portions electrically conductive to a sufficient extent so as to close an operative relay circuit between the contacts 74. The liquid chemical applied to the bill by the hose 136 from the container 128 on the other hand, will moisten an inked portion of the bill so that an eraser device 140 driven by the eraser motor 142 also mounted on the carriage assembly 108 may attempt to remove the ink from the bill. Should the ink be removed from the bill, the detector 58 will then indicate that the inked portion has become light transmissive when the cradle with the bill is moved to the down position. The bill will accordingly be rejected as counterfeit. It will therefore be apparent, that when the carriage 108 is moved upon energization of the solenoid 120, both the heater device 116 and the eraser motor 142 will be energized.

Summarizing the operations involved in the present device, it will be recalled that the bill 20 is placed within the transport cradle slide 18 with the upper edge thereof flush with the upper surface 50 of the cradle. The denominational selector switch 26 is then manipulated to a position corresponding to the denomination of the bill being detected. The start switch 24 is then actuated. The cradle slide 18 is then withdrawn to its intermediate position. Next the material testing carriage assembly 108 is actuated by the solenoid 120 and the eraser motor 142 energized together with the heater device 116. The testing carriage 108 moves toward the cradle 18 in its intermediate position causing the containers 128 and 130 to squirt their contents onto the bill and finally bring the eraser device 140 and the heater device 116 into contact with the bill. If the quality of the currency paper is such as to indicate it is counterfeit or unduly worn the chemical supplied to the bill by the hose 138 will render the bill conductive between the contact 74 providing a signal to the control system whereupon the cradle slide is moved with the bill to its down position and then returned to its upper position. The bill remains within the cradle slide and returns therewith for rejection purposes. During the operations, indicator light 28 or 30 will become illuminated to indicate the denomination of the bills being defected. Should the bill pass the electrical conductivity test offered by the chemical in the container 130 and the contacts 74, the cradle 18 moves from its intermediate position to its down position whereupon the light bulbs 60 and 62 for the opaque detectors 54 and 56 are energized together with the light bulbs 64 for the erased ink detector 58. Should any of the latter photocell detectors be rendered conductive, the cradle slide is returned to its up position with the bill therein for rejection purposes. On the other hand, should the bill pass the opaque detection and the erasure detection tests, the cradle remains in its down position whereupon the bulbs 80, 72 and 73 are energized in order to respectively render the photocell detectors 78, 68 and 70 conductive. Should the bill be genuine, all of the latter photocells are rendered conductive in order to energize the ejector motor 90 removing the bill 20 from the slide cradle 18 before the cradle is returned to its upper position. If the bill is ejected as a genuine bill, the light indicator 32 is illuminated to verify this condition. Also, should the bill be accepted by the device, either the indicator 28 or the indicator 30 will illuminate in order to verify the denomination of the genuine bill.

Referring now to FIGURE 12, the control system and circuitry for accomplishing the foregoing automatic sequential operations, is illustrated. It will therefore be observed from FIGURE 12, that the detector 54 or the detector 56 depending upon the position of the selector switch 26, is electrically connected between the base and emitter of a relay control transistor 144. When the transistor 144 is rendered conductive, by closing of the circuit to either the photocell detector 54 or 56, the relay device 146 is energized in order to move switch element 148 from contact 150 into engagement with contact 152. The contact elements 74 are electrically connected between the emitter and base of the relay control transistor 154 for rendering it conductive when sufficient current flows between the contact elements 74 so as to energize the relay 156 moving the relay switch 158 from contact 160 to contact 162. The control transistor 164 is rendered conductive by the photocell detector 78 electrically connected between the emitter and base thereof so as to energize the relay 166 moving the switch 168 to close on the contact 172. The photocell detector 58 when conductive, renders the transistors 174 conductive by being connected between the base and emitter thereof. The relay 176 is thereby energized to move the relay switch element 178 from contact 180 to contact 182. The photocell detector 68 when conductive renders the transistor 184 conductive by being connected to the base and emitter thereof. The relay 186 is thereby energized in order to close the relay switch device 188. Similarly, the transistor 190 is rendered conductive by the photocell detector 70 when connected thereto through the selector switch 26. The relay 192 is thereby controllably energized to close the switch device 194. All of the relay devices 146, 156, 166, 176, 186 and 192 are therefore connected by conductor 196 to a source of D.C. current derived from the secondary 198 of a transformer 200, the primary 202 of which is connected to a source of A.C. current. The other terminals of the relay devices are connected to the respective emitters of the relay control transistors while the collector elements of said transistors are connected by the conductor 204 to the other terminal of the D.C. current source from the transformer secondary 198. It will therefore be apparent that if none of the transistors are rendered conductive, none of the associated relay devices will be energized. The conductor 196 will therefore be electrically connected by the switch element 148 to the conductor 206 through the contact 150 and through the switch element 158 and contact 160 to supply D.C. current to a reject line 208. Should however, the transistor 154 be rendered conductive to energize the relay 156, all of the switch elements 148, 158, 168 and 178 will be in series and disconnected from the reject line 208. On the other hand, should any of the relay devices 148, 166 and 176 be energized its associated switch element will connect the conductor 196 from the D.C. source of current to the reject line 208. The relay 156 differs therefore from the others in that it maintains the reject line 208 disconnected from the source of current only when it is energized. Therefore, the relay 156 is maintained normally energized by being connected in parallel to the D.C. source of current by the normally closed relay control switch 210 controllably actuated by a timer cam 212. The timer cam 212 on the other hand is driven by a timer motor 214 which also controllably actuates a starter control switch device 216. The timer cam 212 further controls in proper sequence following actuation of the starter control switch 216, the opening and closing of the relay control switch 210, and the photocell control switches 218 and 220 that respectively cause energization of the photocell bulbs. Control over the timer motor 214 and the cradle driving motor 46 is provided by the motor control relay 222 which also cooperates with the cradle limit switch 224. Control over the ejector motor 90 is provided for by the ejector motor control relay 226 which is associated with a normally open ejector control switch 228 connected to the reject line 208. Energization of the ejector control relay 226 on the other hand is effected by its connection to an accept line 230. The accept line 230 is in turn electrically connected to the switch element 194. The accept line may thereby be connected to the source of current through line 196 and switches 148, 158, 168 and 178 provided both of the relays 186 and 192 are energized so as to electrically connect the accept line 230 to the D.C. source of current. If at the same time, the relay 166 is energized closing the switch element 168, the reject line 208 is also supplied with current so that the ejector motor 90 and accept indicator 32 may be energized through the switch 228 closed by energization of the eject control relay 226.

Operation of the control system will therefore become apparent from the foregoing and following description. The bill 20 when inserted in the cradle slide 18, closes the insert switch devices 76 by engagement therewith so as to complete the connection of conductor 232 to the source of A.C. current through the primary 202 of the transformer 200. The insert switches 76 accordingly condition the circuit for operation so that when the starter switch 24 is depressed, current is supplied through the line 234 to the relay 222 actuating the relay holding switch 236, cradle motor reversing switch 238 and the timer starting switch 240. The closing of the timer starting switch 240 closes a circuit through line 242 and 244 and the timer motor 214 in order to start the timer. In the meantime, the closed relay control switch 210 maintains the relay 156 energized in order to hold all of the associated relay switches in a position disconnecting the D.C. line current from the reject line 208. However, the current in the line 234 is connected through the closed relay holding switch 236 and the actuated cradle motor reversing switch 238 to supply current to the down terminal 246 through the conductor 248 in order to start the cradle slide 18 downwardly. The cradle limit switch 224 is thereby moved from its contact 250 to the contact 252. In the meantime, timer cam 212 has been moved from its initial position by the timer motor 214 so as to actuate the starter control switch 216 disconnecting the line 254 and connecting the power line 242 to the line 244 providing a holding circuit for maintaining the timer motor energized for one revolution. Simultaneously therewith, current is supplied to line 256 by means of which the solenoid 120 is energized together with the heater device 116 and the eraser motor 142. It will be further apparent, that since the line 254 has been disconnected from the limit switch 224 and the limit switch 224 disconnected from the contact 250, no current will be supplied to the starter control relay 222 whereupon the relay is deenergized to thereby deenergize the cradle driving motor 46 to stop the cradle at its intermediate position. The carriage assembly 108 thereby moves toward the cradle while it is in its intermediate position causing the chemical containers 128 and 130 to squirt chemical onto the bill 20 and bringing the heater device 116 and eraser device 140 into contact with the bill 20. The timer cam 212 continues to rotate and momentarily opens the relay control switch 210. If the chemical from the container 130 impregnating the currency paper is effective to electrically bridge the contacts 74, the transistor 154 will be rendered conductive to maintain the relay 156 energized even though the switch 210 has opened. The reject line 208 is thereby maintained open indicating that the bill is to be rejected. When the notch in the timer cam 212 moves away from the switch 210 the switch 210 closes once again to hold the reject line 208 open. The timer cam 212 accordingly returns to its start position after one revolution of movement, causes the switch device 216 to again connect line 254 to the source of current whereupon the reverse control switch 238 of the deenergized relay 222 connects the line current to the up terminal 258 through conductor 260 after the cradle motor 46 has moved the cradle to its down position restoring the limit switch 224 to its initial position. The cradle is then returned to its upper position with the bill 20 therein.

Referring again to the intermediate position of the cradle, should the bill not be conductive between the contact elements 74 after being moistened by the chemicals, the transistor 154 will not be conductive so that when the switch 210 is opened by the timer cam 212, the relay 156 is deenergized so that the switch element 158 will be effective to connect the line 196 to the reject line 208 supplying thereto D.C. current. The relay 222 will then be reenergized through the connection 262 from the reject line 208, line 254 and contact 252 through the actuated limit switch 224 supplying current to the line 234. The cradle motor 46 is thereby supplied with current from the reject line 208 at its down terminal 246 to continue movement of the cradle to its down position whereupon the limit switch 224 is released to its initial position to thereby disconnect the reject line 208 from the line 234, deenergizing the relay 222 and stopping the cradle in its down position. The switch 210 will then be restored to its closed position by the timer cam 212, disconnecting the reject line 208 by causing energization of the relay 156. The relay 222 is then deenergized to condition the cradle motor reversing switch 238 so as to connect the reject line 208 to the up terminal 258 for moving the cradle upwardly should the reject line 208 subsequently become connected to the D.C. line current. The timer 212 is sequentially operative thereafter to momentarily close the switch 218 whereupon the photocell bulbs 64, 60 and 62 are energized. Should the bill be light transmissive in those areas aligned with the opaque detectors 58, 54 and 56, the associated transistors and relays will be energized in order to connect D.C. current to the reject line 208 thereby returning the cradle to its up position in order to reject the bill. On the other hand, if the bill is not light transmissive, nothing occurs and the timer cam 212 proceeds to open the switch 218 and close momentarily the switch 220 thereby energizing the photocell bulbs 72, 73 and 80. If the detectors 68 and 70 are not conductive because the bill is counterfeit, the accept line 230 remains open so as to prevent energization of the eject control relay 226 which prevents operation of the ejector 90. Should the detector 78 not become conductive because of blackening of the paper by the heater device 116, the relay 166 will not be energized since the transistor 154 will not be conductive and no current connection will be made to the reject line 208 necessary to energize the ejector motor 90 even if the ejector control relay 226 should be energized. Therefore, should the bill pass this final test, both of the relays 186 and 192 will be energized to close switches 188 and 194 connecting the current through accept line 230 to the ejector relay 226 for energization thereof while at the same time relay 166 will be energized in order to connect current in line 196 to the reject line 208 thereby energizing the ejector motor 90 through the closed ejector control switch 228. The bill 20 is thereby removed from the cradle. The cradle in the meantime is moved to its up position. The timer cam 212 then returns to its start position so that the switch device 216 is returned to its initial position breaking the holder circuit through the timer motor for stopping thereof.

From the foregoing, it will be appreciated that when the ejector motor 90 is energized, the indicator light 32 is illuminated to indicate the removal of the bill. Also, when the selector switch 26 is in one of its positions as illustrated in FIGURE 12, should the bill be accepted, the detector 70 will be conductive and thereby cause the lamp 28 to illuminate indicating the detection of a bill of a denomination characterized by the placement of the detectors 70 and 54. When the selector 26 is actuated to the other position from that illustrated in FIGURE 12, the transistor 190 is shorted across the emitter and biased to render it conductive for holding the relay 196 energized. The denominational lamp 30 is thereby also energized for indicating the detection of a bill characterized by the placement of the detector 56 and the operative removal of detector 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A detecting device for paper currency or the like comprising, operational conditioning means for receiving currency, material testing means responsive to reception of currency within said operational conditioning means for subjecting the currency to material quality tests, signal means operatively connected to said material testing means for issuing reject signals in response to the presence of unfit currency, reject means operatively connected to the signal means for rejecting unfit currency upon receipt of a reject signal from the signal means, pattern detecting means operatively connected to the signal means and operational conditioning means operative to sense predetermined patterns established on the currency by the material testing means and printing thereon for signalling the presence of counterfeit and unfit currency through the signal means, denominational selector means operatively connected to the pattern detecting means operative to produce reject signals in the signal means in response to the presence of currency other than a selected denomination, indicating means operatively connected to the pattern detecting means and signal means for indicating acceptance of currency as genuine and the denomination thereof, said material testing means including liquid applying means for moistening a portion of the currency, and electrical conductivity sensing means for detecting a predetermined amount of conductivity of a moistened portion of the currency, said material testing means further including, eraser means engageable with an inked part of said moistened portion of the currency to test ink retentivity thereof by rendering said inked part light transmissive if counterfeit.

2. The combination of claim 1, wherein said material testing means still further includes heating means for contact with the currency to test heat resistivity thereof by rendering a light transmissive portion of the currency opaque if counterfeit.

3. The combination of claim 2, wherein said operational conditioning means comprises currency receiving transport means sequentially movable from a currency receiving position to a material testing position and a pattern detecting position, moving means drivingly connected to said transport means for movement thereof between said positions and control means operatively connected to said transport means and signal means for rendering the material testing means and pattern detecting means operative when the transport means is respectively in said material testing and pattern detecting positions.

4. The combination of claim 3 wherein said pattern detecting means comprises a plurality of photocell detectors mounted on the operational conditioning means in a prearranged pattern on one side of the currency and light emitting means fixedly positioned on the other side thereof for transmission of light through light transmissive areas of the currency when in a pattern detecting position.

5. The combination of claim 4, wherein said reject means includes ejector means operative to remove the currency from the operational conditioning means and means operatively connecting the ejector means to the signal means for rendering the ejector means inoperative in response to reject signals for return of counterfeit or unfit currency by the operational conditioning means.

6. The combination of claim 5, wherein said denominational selector means includes means for rendering selected photocell detectors inoperative.

7. The combination of claim 6, wherein said signal means comprises power supply means rendered operative by the operational conditioning means in response to reception of currency, relay means operatively connected to the power supply means and operatively conditioned when said power supply means is rendered operative, timer means rendered operative simultaneously with the relay means for subsequently rendering the material testing means operative and reconditioning the relay means for reception of reject signals.

8. A detecting device for paper currency or the like comprising, operational conditioning means for receiving currency, material testing means responsive to reception of currency within said operational conditioning means for subjecting the currency to material quality tests, signal means operatively connected to said material testing means for issuing reject signals in response to the presence of unfit currency, and reject means operatively connected to the signal means for rejecting unfit currency upon receipt of a reject signal from the signal means, said material testing means including, liquid applying means for moistening a portion of the currency, eraser means engageable with an inked part of said moistened portion of the currency to test ink retentivity thereof by rendering said inked part light transmissive if counterfeit.

References Cited in the file of this patent

UNITED STATES PATENTS

| | | |
|---|---|---|
| 2,104,079 | Kahn | Jan. 4, 1938 |
| 2,950,799 | Timms | Aug. 30, 1960 |
| 2,957,387 | Patzer | Oct. 25, 1960 |
| 2,967,452 | Patzer | Jan. 10, 1961 |